(12) United States Patent
Calippe et al.

(10) Patent No.: US 8,543,673 B2
(45) Date of Patent: Sep. 24, 2013

(54) RAPID PROVISIONING OF NETWORK DEVICES USING AUTOMATED CONFIGURATION

(75) Inventors: Joël R. Calippe, Sunnyvale, CA (US); Gurudas Somadder, San Jose, CA (US); Hua Shu, Sunnyvale, CA (US); Jeff Carman, Kemptville, CA (US)

(73) Assignee: Alcatel Lucent, Paris (FR)

( * ) Notice: Subject to any disclaimer, the term of this patent is extended or adjusted under 35 U.S.C. 154(b) by 519 days.

(21) Appl. No.: 12/427,558

(22) Filed: Apr. 21, 2009

(65) Prior Publication Data

US 2010/0268803 A1    Oct. 21, 2010

(51) Int. Cl.
G06F 15/16    (2006.01)

(52) U.S. Cl.
USPC ............................................. 709/221

(58) Field of Classification Search
USPC ............................................. 709/221
See application file for complete search history.

(56) References Cited

U.S. PATENT DOCUMENTS

| | | | |
|---|---|---|---|
| 2005/0120099 A1* | 6/2005 | Marce et al. | 709/221 |
| 2005/0257039 A1* | 11/2005 | Marshall | 713/1 |
| 2007/0005736 A1* | 1/2007 | Hansen et al. | 709/220 |
| 2007/0019745 A1* | 1/2007 | Donadio et al. | 375/259 |
| 2009/0052328 A1* | 2/2009 | Rentschler et al. | 370/241 |
| 2009/0125541 A1* | 5/2009 | Amon | 707/102 |
| 2009/0129384 A1* | 5/2009 | Regan | 370/390 |
| 2009/0282129 A9* | 11/2009 | Tindal | 709/220 |
| 2010/0228837 A1* | 9/2010 | Squire et al. | 709/220 |

* cited by examiner

Primary Examiner — Lynn Feild
Assistant Examiner — Bryan Lee
(74) Attorney, Agent, or Firm — Kramer & Amado P.C.

(57) ABSTRACT

Various exemplary embodiments relate to a method and related network node including one or more of the following: receiving a selection of a configuration template and a second network node to serve a first network node, the configuration template including at least one template field; receiving at least one value for the at least one template field of the configuration template; configuring the first network node according to the configuration template and the at least one value; receiving, in the network management system, configured device information from the first network node; using the configured device information to identify at least one configuration operation to perform on the second network node to provide connectivity to the first network node; generating at least one configuration module for performing the at least one configuration operation; and applying the at least one configuration module to the second network node.

11 Claims, 3 Drawing Sheets

RAPID PROVISIONING OF NETWORK DEVICES USING AUTOMATED CONFIGURATION

TECHNICAL FIELD

Embodiments disclosed herein relate generally to network management systems.

BACKGROUND

As the application of various communications networks expands to provide an increasing number of users with advanced functionalities, faster connection speed and higher bandwidth throughput are required to accommodate all users with reliable connectivity. This requires service providers to constantly deploy new networking equipment, both to expand the reach of their offered network and to upgrade outdated and nonfunctional equipment.

In many cases, new equipment must be properly configured by the service provider in order to provide the intended functionality to neighboring nodes. In many situations, however, configurations will vary only slightly between similar equipment within the same network. This creates a significant amount of time being spent performing the same set of configuration tasks on each new network element. These configuration tasks must often be performed by highly-trained experts familiar with the functionalities of the network element and the configuration process. Employing such experts is costly to the service provider, as the experts are usually compensated at a rate significantly higher than that paid to an employee of minimal training.

For example, in many mobile networks, the routers used to aggregate the various services supported by a number of base transceiver stations require mostly the same configuration with only minor differences between them, such as certain service endpoint and port configurations. Configuration of one such aggregation router according to current techniques normally takes approximately fifteen minutes to one hour and typically must be performed by a trained expert. It is estimated that service providers currently may deploy as many as 3,000 such aggregation routers per year, with this number increasing as time goes on. Using the fifteen minute configuration estimate, this leads to 45,000 minutes, or nearly nineteen 40-hour weeks worth of configuration work by trained experts.

Similarly, neighboring nodes must often be configured when installing new network equipment in order to provide the desired functionality. For example, configuration of ports, service endpoints, or multi-protocol label switching may be required of neighboring nodes before the new equipment can function properly. As above, such configurations may vary only slightly for each new network node, introducing a significant amount of configuration overhead due to repetitive tasks.

For the foregoing reasons and for further reasons that will be apparent to those of skill in the art upon reading and understanding this specification, there is a need for a network configuration system that minimizes the amount of time taken to perform repetitive configurations of network nodes and allows such configurations to be performed by a person of minimal training.

SUMMARY

In light of the present need for a network configuration system that minimizes the amount of time taken to perform repetitive configurations of network nodes and allows such configurations to be performed by a person of minimal training, a brief summary of various exemplary embodiments will be presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: receiving a selection of a configuration template and a second network node to serve the first network node, wherein the configuration template includes at least one template field to be set before configuration of the first network node; receiving at least one value for the at least one template field of the configuration template; configuring the first network node according to the configuration template and the at least one value for the at least one template field of the configuration template; receiving, in the network management system, configured device information from the first network node; using the configured device information to identify at least one configuration operation to perform on the second network node to provide connectivity to the first network node; generating at least one configuration module for performing the at least one configuration operation; and applying the at least one configuration module to the second network node.

BRIEF DESCRIPTION OF THE DRAWINGS

In order to facilitate understanding of the various exemplary embodiments, reference is made to the accompanying drawings, wherein.

DETAILED DESCRIPTION

Figure 1:
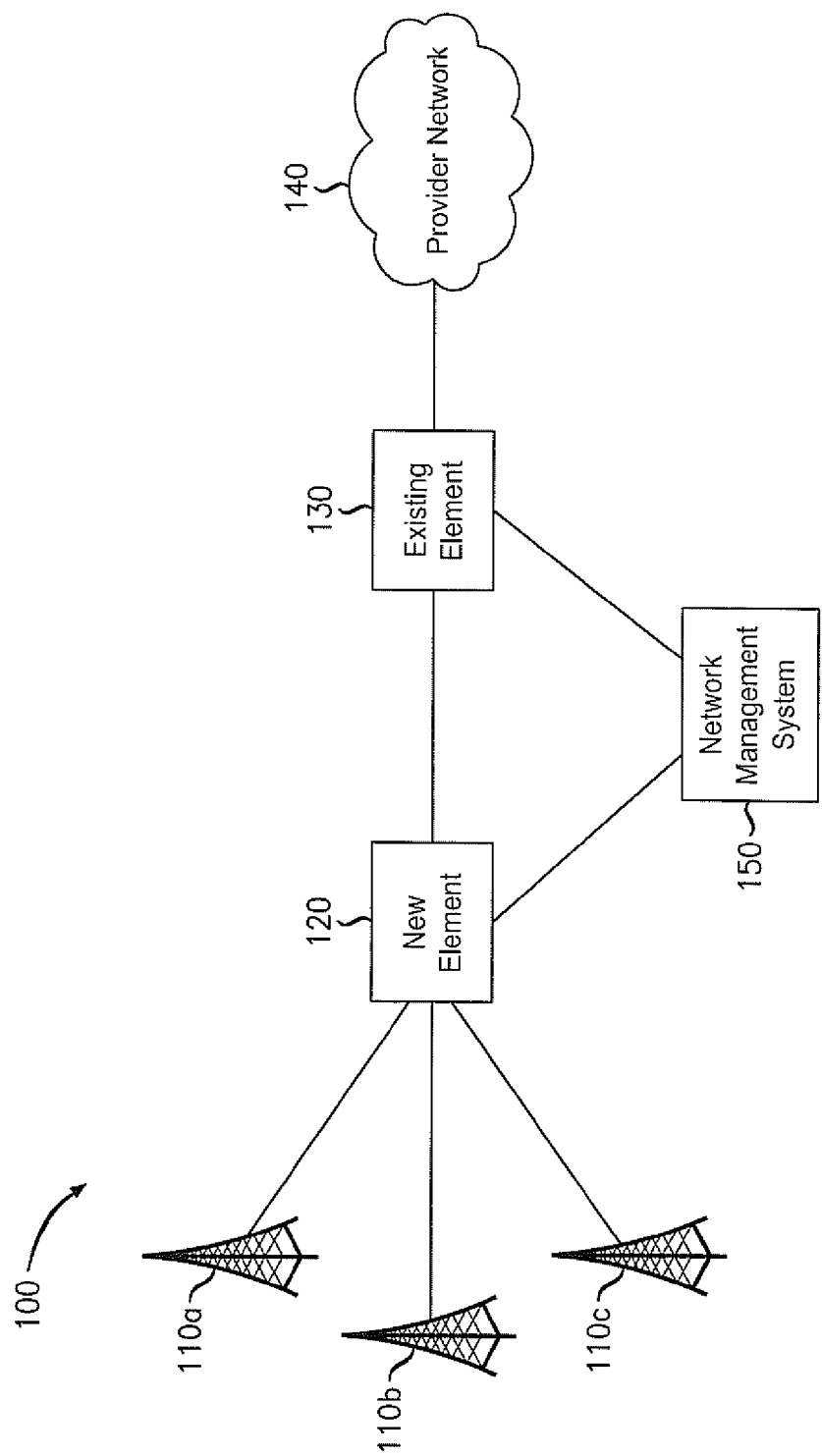
FIG. 1 is a schematic diagram showing an exemplary network including a new network element and a network management system.

Referring now to the drawings, in which like numerals refer to like components or steps, there are disclosed broad aspects of various exemplary embodiments.

FIG. 1 is a schematic diagram showing an exemplary network 100 including a new network element 120 and a network management system (NMS) 150. Exemplary network 100 may include base stations 110a, 110b, 110c, a new network element 120, an existing network element 130, a provider network 140, and an NMS 150. It should be apparent that various exemplary embodiments may be implemented on any network requiring configuration of new nodes and that network 100 is provided merely as an example of one such network.

Base stations 110a, 110b, 110c may each be any network element requiring connection to a provider network 140 through a new element 120 in order to provide some service. For example, base stations 110a, 110b, 110c may be base transceiver stations that provide service to mobile devices in a mobile network.

New element 120 may be a router, switch, or other network equipment. For example, new element 120 may be a service aggregation router that handles traffic between multiple base stations 110a, 110b, 110c and provider network 140. In order to function properly, new element 120 may require some user configuration. Such configuration may include, for example, setting up ports, label-switched paths, and service access points.

Existing element 130 may be a router, switch, or other network equipment. For example, existing element 130 may be a service router for providing connectivity between a service aggregation device or other network element and a provider network 140. Existing element 130 may already be configured to provide service to many other network elements (not shown), yet require additional configuration to provide service to new element 120. Such additional configuration may include, for example, adding a service access point and creating a label switched path.

Provider network 140 may be any network for providing a service. Provider network 140 may be packet-switched or circuit switched. Further, provider network 140 may provide, for example, phone and Internet service to various user devices in communication with provider network 140 through exemplary network 100.

NMS 150 may be a machine capable of remotely performing configuration operations on new element 120 and existing element 130. NMS 150 may be, for example, a service aware manager and may be capable of configuring new element 120 and existing element 130 via command line instructions or Simple Network Management Protocol (SNMP) instructions. NMS 150 may store a number of configuration templates for use in configuring various types of network elements. NMS 150 may similarly retrieve configuration details from new element 120 using, for example, the SNMP protocol.

According to various exemplary embodiments, a user at NMS 150 may select a configuration template to use in configuring new element 120. This configuration template may be previously constructed from an existing node configuration by parsing such a configuration to identify a number of fields within the configuration that must be given new values before application to a different element. Alternatively, the configuration template may be written completely by a network analyst who leaves a number of fields that must be populated with values before application of the template.

The user may additionally select a neighboring node (in this case, existing element 130) to provide service to new element 120. The NMS 150 may then ask the user to provide values for each of the fields in the configuration template. The NMS 150 may proceed to configure the new element 120 via command line instructions according to the selected template and user-provided values.

After configuration of the new element 120 is complete, the NMS 150 may request and receive a description of new element 120 and its now configured state via, for example, SNMP. Using this information, NMS 150 may then determine what configuration must be performed on existing element 130 to provide service to new element 120. After this determination is made, NMS 150 may request values for additional configuration fields and may then perform the required configurations on existing element 130 via, for example, SNMP. The operation of NMS 150 will be described in greater detail below with reference to FIGS. 2-3.

Figure 2:
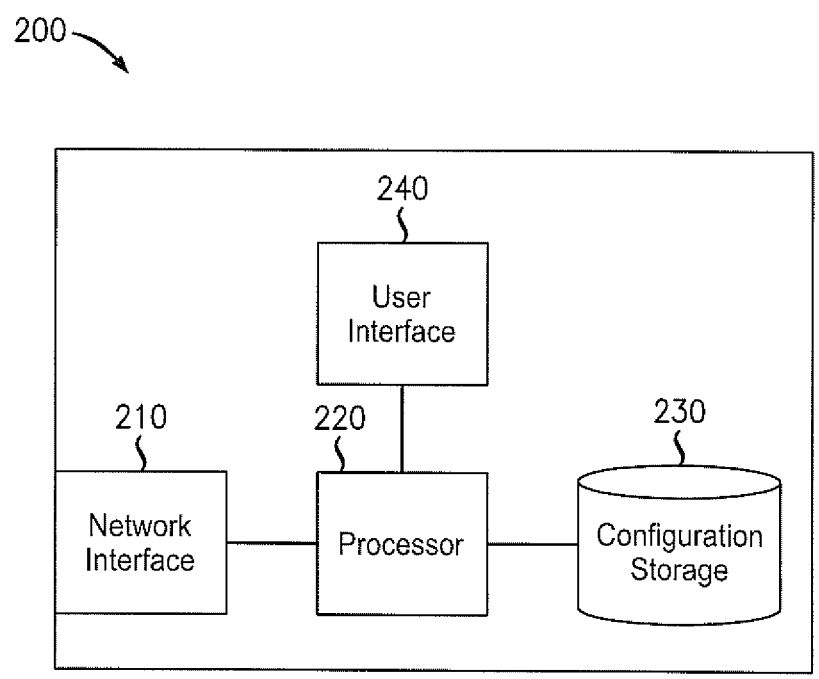
FIG. 2 is a schematic diagram of an exemplary network management system capable of configuring a new network element.

FIG. 2 is a schematic diagram of an exemplary NMS 200 capable of configuring new network elements 120. NMS 200 may correspond to NMS 150 of FIG. 1. NMS 200 may include network interface 210, processor 220, configuration storage 230, and user interface 240.

Network interface 210 may be an interface comprising hardware and/or executable instructions encoded on a machine-readable storage medium configured to transmit and receive packets over a packet-switched network. Network interface 210 may be used to receive configured device information and to transmit configuration commands to other elements in the network.

Processor 220 may be a conventional microprocessor, a Field Programmable Gate Array (FPGA), or any other component configured to execute a series of instructions to control the interoperation of network interface 210, configuration storage 230, and user interface 240, and to configure new and existing elements elsewhere in the network. In various exemplary embodiments, processor 220 may receive, through user interface 240, a selection of a configuration template located in configuration storage 230 and a number of values for a number of fields in the selected configuration template. Processor 220 may then configure a network element via command line instructions issued through network interface 210.

Processor 220 may then go on to request that the newly configured element send back a description of its now-configured state. Using this information, processor 220 may identify and perform, via SNMP, a series of configurations that must be applied to a selected neighboring node before service can be provided via the new element.

Storage 230 may be a machine-readable medium that stores a number of configuration templates for use in configuring new network elements. The stored configuration templates may be previously designed by network analysts and include a series of command line instructions to be performed on a new network element. These configuration templates may include or describe all configurations necessary to place a new element in operational condition.

The configuration templates may include a series of command line instructions for configuring a network element or may simply describe what configurations must occur in another format such as, for example, extensible markup language (XML). The configuration templates may each include a plurality of fields that must be filled in by a user before application of a template to any given node. These fields may correspond to information that changes among different installations of similar network elements. Storage 230 may further store configured device information for managed devices. This information may be retrieved after configuration of a device via SNMP.

User interface 240 may be an interface comprising hardware and/or executable instructions encoded on a machine-readable storage medium configured to receive input from an end user and present output to the user. User interface may include, for example, a keyboard, a monitor, and a graphical user interface (GUI). An end user may use user interface 240 to indicate to NMS 200 what configuration template to apply to a new element, values for template fields, and what existing node will serve the new element and therefore must be configured.

Figure 3:
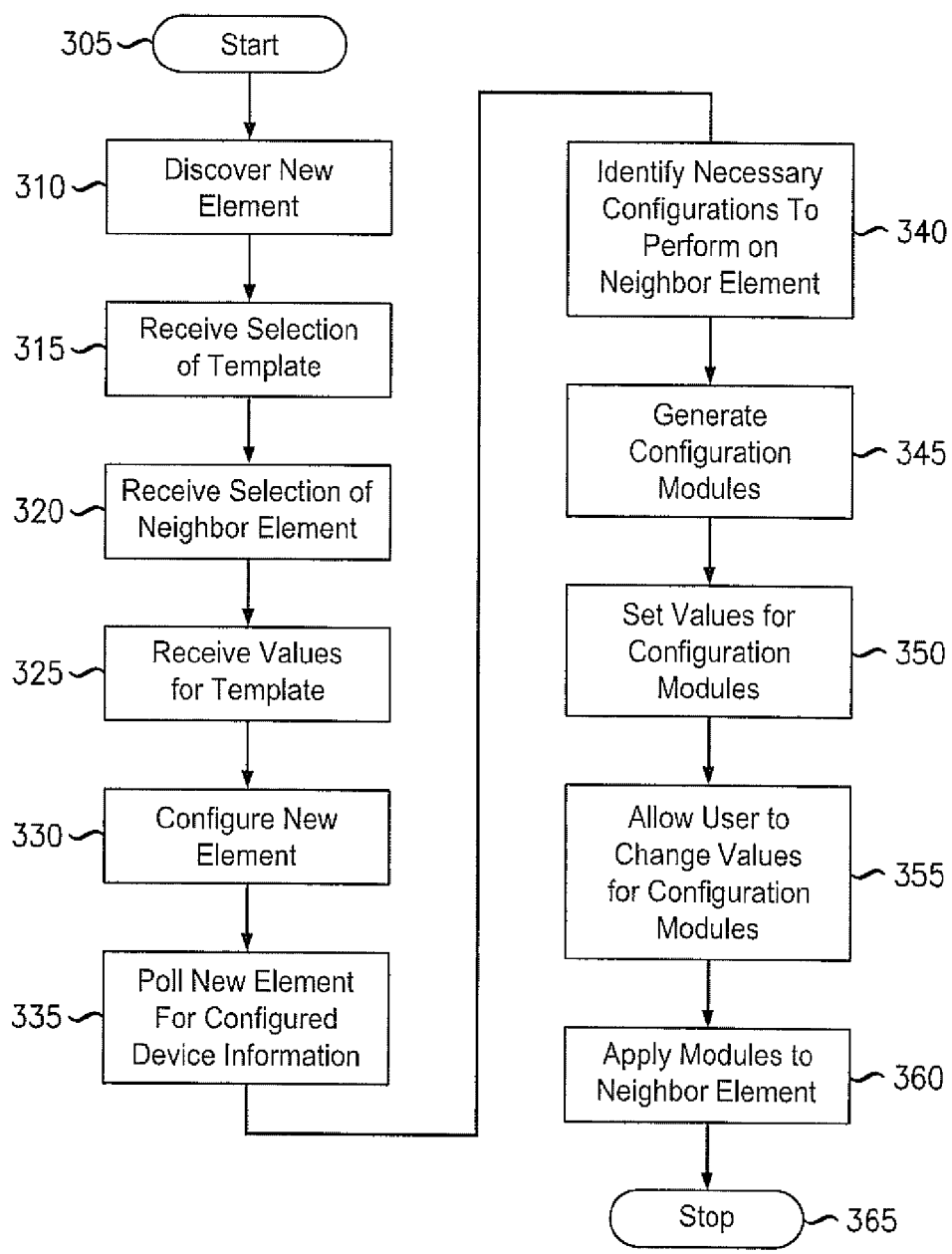
FIG. 3 is a flow diagram of an exemplary method for configuring a new element and neighboring element.

FIG. 3 is a flow diagram of an exemplary method 300 for configuring a new element 120 and neighboring element. Exemplary method 300 may be performed, for example, by processor 220 of NMS 200 and/or by NMS 150 in order to quickly configure elements in a network to provide service via a new network element. It should be apparent that, although described as performed by NMS 150 in the description that follows, any of the steps of method 300 may be performed by any system at which configuration of network elements is desirable.

Method 300 starts at step 305 and then proceeds to step 310 where NMS 150 discovers a new element installed in the network. This discovered element may correspond to new element 120. This step may be performed according to any method known to those skilled in the art, such as polling connected devices or receiving a notification from a newly activated device.

NMS 150 may then receive a selection from the user via user interface 240 of a configuration template to apply to new element 120 at step 315. The user may make this selection from a list of available configuration templates presented to the user via user interface 240. Such a list may display all available configuration templates or may display only a subset of the available configuration templates such as, for example, only those templates applicable to the type of network device to be configured. Alternatively, the user may specify a file location of a specific configuration template to be used.

At step 320, NMS 150 may receive a selection from the user of a neighboring element to provide connectivity between the new element 120 and provider network 140. This neighboring element may correspond to existing element 130. This step may be as simple as the user selecting a device from a list of devices managed by NMS 150. Alternatively, if the user wishes to specify, as the neighboring device, a device that is not managed by NMS 150, the user may identify the device by other means such as, for example, its IP address.

At step 325, the user may be presented with a number of fields via user interface 240 for the selected configuration template. These fields may correspond to information that changes among different configurations of similar devices. NMS 150 may present a series of blank fields or may provide default values for each field. Such default values may be already contained in the configuration template or may be generated by the NMS 150 based on, for example, possible working values and previous user input. The user may provide values for each of these fields and method 300 may proceed to step 330.

At step 330, NMS 150 may configure the new element 120 according to the selected configuration template and the values provided in step 320. This configuration may include NMS 150 issuing command line instructions to new element 120 via Telnet, secure shell (SSH), or other similar protocol. Such command line instructions may be simply read from the selected configuration template or may be generated by the NMS 150 to accomplish the configurations outlined in the configuration template.

Method 300 may move to step 335 after configuration of new element 120 is complete. At step 335, NMS 150 may poll new element 120 for configured device information. In response, NMS 150 may receive configured device information for new element 120. Because the new device 120 is now fully configured, the configured device information may be transmitted and received via SNMP or a similar protocol. NMS 150 may use this information to ensure that new element 150 was properly configured in step 330 and may store the information for future use.

Method 300 may then proceed to step 340 where, using the configured device information, NMS 150 may determine what configuration operations must be performed on existing element 130 (identified as the neighboring node by the user in step 320) in order to provide connectivity between new element 120 and provider network 140. NMS 150 may make this determination by, for example, scanning the configured device information for any configured protocols or functionality that requires a reciprocal configuration on a neighboring node. Such configurations requiring reciprocal configuration may include, for example, configuration of multiprotocol label switching (MPLS), multilink point-to-point protocol (MLPPP), label-switched paths (LSP), open shortest path first (OSPF) interfaces, label distribution protocol (LDP) interfaces, service distribution points (SDP), service access points (SAP), virtual leased lines (VLL), virtual private LAN services (VPLS), virtual private remote networking (VPRN), and any other type of service that may require the configuration of a SAP.

By automatically determining what configurations are necessary to be performed on the neighboring node, the NMS 150 reduces the amount of knowledge and experience a user must possess in order to configure a newly installed network element. The user is not required to know which configurations performed on the new element require reciprocal configurations on the neighboring node. Additionally, the NMS 150 minimizes the chance that a user forgets to perform any particular required reciprocal configuration.

Method 300 may then move on to step 345, where NMS 150 may generate configuration modules that may accomplish the required configurations identified in step 340 upon deployment, described below. These configuration modules may include a set of GUI elements for receiving values for a number of fields. These fields may correspond to information needed to properly configure existing element 130 for providing connectivity to new element 120.

At step 350, NMS 150 may set default values for these fields according to the configured device information received in step 335. NMS 150 may then allow the user to tweak these generated values in step 355 before module deployment. Finally, NMS 150 may apply the configuration modules to the existing element 130 in step 360 and method 300 may proceed to terminate in step 365. Application of the modules to the neighbor element may include generating and validating a number of SNMP objects and deploying the objects on the neighboring element according to SNMP methods.

Again, by automatically generating values for each of the module fields and by automatically creating and deploying SNMP objects, the NMS 150 reduces the level of skill required of the user. Additionally, the NMS 150 reduces the amount of time the user must spend in configuring the neighboring node, allowing the user to fully configure the neighboring node quickly and accurately.

For example, consider the configuration of new element 120 in exemplary network 100. Once plugged in, new element may broadcast a message to notify NMS 150 that it has been activated. NMS 150 may then discover the existence of new element 120 and notify a user via user interface 240 that new element 120 must be configured. The user may then select a configuration template from a list of available templates and may select existing element 130 as the node to provide connectivity to new element 120 from a list of managed nodes.

NMS 150 may then present the user with a number of fields that must be given values before new element 120 can be configured. After receiving values for each of the fields, the NMS 150 may initiate a Telnet, SSH, or other connection with new element 120 and issue a series of command line instructions to accomplish the configurations specified by the selected configuration template and user-provided template field values.

After configuration of the new element 120 is complete, NMS 150 may send an SNMP request to new element 120 for information related to its configured state. After verifying the success of the configuration of new element 120, NMS may determine that it must perform certain configuration operations on existing element 130 before new element 120 is fully operational. For example, NMS 150 may see that a SAP for a VLL service is configured on new element 120 and deduce that a matching SAP must be added to the VLL service at existing element 130.

Accordingly, NMS 150 may generate and display a series of configuration modules to perform these required configurations on existing element 130. These modules may contain a number of fields that must have values before configuration of existing element 130 can be performed. NMS 150 may generate default values for these fields and allow the user to change these values. NMS 150 may then apply the configuration modules by creating and validating a series of SNMP objects and deploying the objects on existing element 130 according to SNMP methods. After this step, new element 120 will be fully functional.

According to the foregoing, various exemplary embodiments allow for a network configuration system that minimizes the amount of time taken to perform repetitive configurations of network nodes and allows such configurations to be performed by a person of minimal training. In particular, by utilizing predesigned configuration templates to configure a new element and by automatically configuring a neighboring element according to the new element's configuration, a network management system may enable minimally trained personnel to quickly and efficiently configure newly installed network elements to provide their intended service within a communications network.

It should be apparent from the foregoing description that various exemplary embodiments may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch) or network management system. Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method of configuring a first network node performed in a network management system, the method comprising:
   receiving, from a user, a selection of a second network node to provide connectivity between the first network node and at least one other device;
   configuring the first network node, comprising:
      receiving a selection of a configuration template in the network management system, wherein the configuration template includes at least one template field to be set before configuration of the first network node,
      receiving at least one value for the at least one template field of the configuration template, and
      configuring the first network node according to the configuration template and the at least one value for the at least one template field of the configuration template;
   receiving, in the network management system, configured device information from the first network node, wherein the configured device information is representative of a state of the first network node after being configured;
   using the configured device information to identify at least one configuration operation to perform on the second network node to provide connectivity to the first network node, wherein the at least one configuration operation comprises adding a service access point to a virtual leased line service on the second network node;
   generating at least one configuration module for performing the at least one configuration operation on the second network node;
   configuring a plurality of module fields of the at least one configuration module according to the configured device information; and
   applying the at least one configuration module to the second network node.

2. The method of claim 1, further comprising:
   receiving at least one value for at least one module field of the plurality of module fields; and
   updating the at least one configuration module according to the at least one value for the at least one module field.

3. The method of claim 1, wherein the configured device information is received using Simple Network Management Protocol (SNMP).

4. The method of claim 1, wherein applying the at least one configuration module to the second network node comprises sending a configuration update to the second network node using Simple Network Management Protocol (SNMP).

5. A network management system for configuring a first network node, the network management system comprising:
   a configuration storage that stores at least one configuration template;
   a user interface that:
      receives, from a user, an identification of a second network node to provide connectivity between the first network node and at least one other device,
      a selection of a configuration template from the at least one configuration template to apply to the first network node, wherein the configuration template includes at least one template field to be set before configuration of the first network node, and
      at least one value for the at least one template field of the configuration template;
   a network interface that transmits configuration commands and receives configured device information, wherein the configured device information is representative of a state of the first network node after being configured; and
   a processor configured to:
      configure the first network node, comprising configuring the first network node according to the configuration template and the at least one value for the at least one template field of the configuration template,
      request configured device information from the first network node,
      use the configured device information to identify at least one configuration operation to perform on the second network node to provide connectivity to the first network node, wherein the at least one configuration operation comprises adding a service access point to a virtual leased line service on the second network node,
      generate at least one configuration module for performing the at least one configuration operation on the second network node,
      configure a plurality of module fields of the at least one configuration module according to the configured device information, and apply the at least one configuration module to the second network node.

6. The network management system of claim 5, wherein the user interface further receives at least one value for at least one module field of the plurality of module fields and the processor is further configured to:
update the at least one configuration module according to the at least one value for the at least one module field.

7. The network management system of claim 5, wherein the configured device information is received using Simple Network Management Protocol (SNMP).

8. The network management system of claim 5, wherein the processor, in applying the at least one configuration module to the second network node, is configured to send a configuration update to the second network node using Simple Network Management Protocol (SNMP).

9. A non-transitory machine-readable storage medium encoded with instructions for configuring a first network node, the machine-readable storage medium comprising instructions for:
receiving, from a user, a selection of a second network node to provide connectivity between the first network node and at least one other device;
configuring the first network node, comprising instructions for:
  receiving a selection of a configuration template, wherein the configuration template includes at least one template field to be set before configuration of the first network node,
  receiving at least one value for the at least one template field of the configuration template, and
  configuring the first network node according to the configuration template and the at least one value for the at least one template field of the configuration template;
receiving, in the network management system, configured device information from the first network node, wherein the configured device information is representative of a state of the first network node after being configured;
using the configured device information to identify at least one configuration operation to perform on the second network node to provide connectivity to the first network node, wherein the at least one configuration operation comprises adding a service access point to a virtual leased line service on the second network node;
generating at least one configuration module for performing the at least one configuration operation;
configuring a plurality of module fields of the at least one configuration module according to the configured device information; and
applying the at least one configuration module to the second network node.

10. The non-transitory machine-readable storage medium of claim 9, further comprising instructions for:
receiving at least one value for at least one module field of the plurality of module fields; and
updating the at least one configuration module according to the at least one value for the at least one module field.

11. The non-transitory machine-readable storage medium of claim 9, wherein the configured device information is received using Simple Network Management Protocol.

\* \* \* \* \*